United States Patent [19]

Filsinger

[11] 4,445,603

[45] May 1, 1984

[54] SAFETY CIRCUIT FOR AN ELECTRONIC THROTTLE CONTROL OF INTERNAL COMBUSTION ENGINES

[75] Inventor: Reinhard Filsinger, Wernau, Fed. Rep. of Germany

[73] Assignee: Daimler-Benz Aktiengesellschaft, Fed. Rep. of Germany

[21] Appl. No.: 301,948

[22] Filed: Sep. 14, 1981

[30] Foreign Application Priority Data

Dec. 9, 1980 [DE] Fed. Rep. of Germany ....... 3034424

[51] Int. Cl.$^3$ ............................................. B60K 41/28
[52] U.S. Cl. ............................. 192/0.055; 192/0.058; 192/0.094; 192/3 M; 123/361
[58] Field of Search ............... 192/0.055, 0.076, 0.075, 192/0.07, 30 W, 3.58, 0.094, 3 M, 0.058; 180/176, 179; 123/350, 352, 361

[56] References Cited

U.S. PATENT DOCUMENTS

| | | | |
|---|---|---|---|
| 3,612,017 | 10/1971 | Ishizaki et al. | 180/179 |
| 3,885,644 | 5/1975 | Seidler et al. | 180/176 |
| 3,952,829 | 4/1976 | Gray | 123/352 |

*Primary Examiner*—George H. Krizmanich
*Assistant Examiner*—M. Manley
*Attorney, Agent, or Firm*—Craig & Burns

[57] ABSTRACT

A safety circuit for an electronic throttle control for internal combustion engines, especially for a so-called electronic accelerator system in motor vehicles which include a brake pedal, a set value transmitter coupled to an accelerator, an electronic circuit that acts on a stepping motor, and a clutch interposed between the stepping motor and a throttle actuated by the stepping motor, with the throttle being coupled to an idle return device. The clutch is adapted to be engaged when the accelerator and brake pedal are not simultaneously actuated and when the gas pedal is actuated alone or together with the brake pedal. The clutch is adapted to be disengaged when the brake pedal alone is actuated.

12 Claims, 3 Drawing Figures

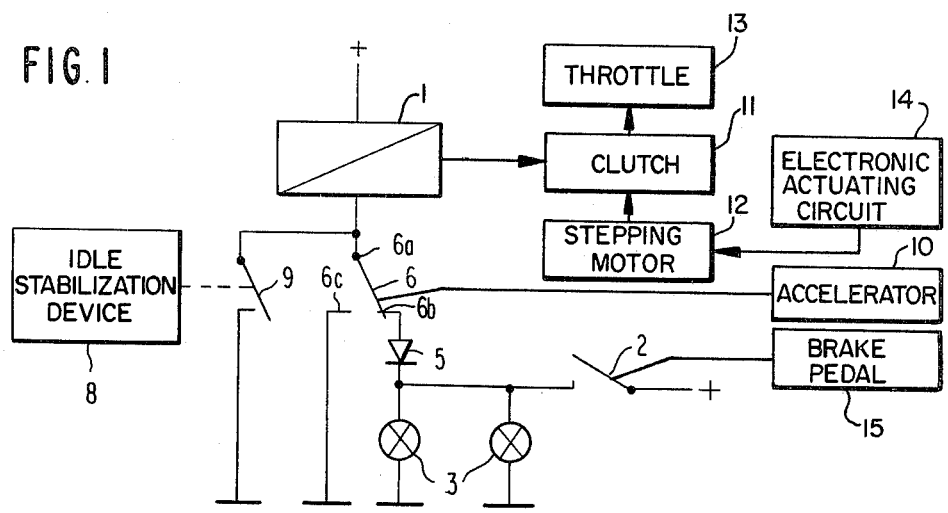
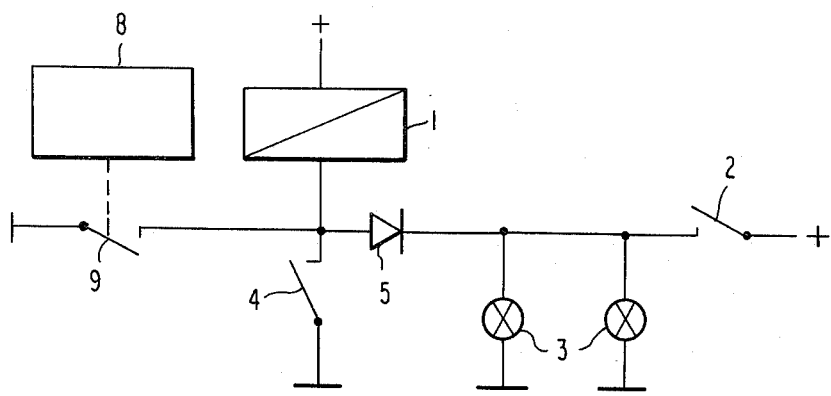
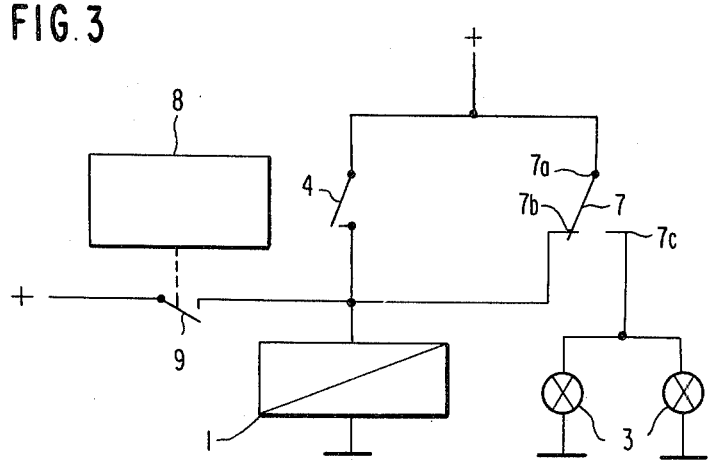

SAFETY CIRCUIT FOR AN ELECTRONIC THROTTLE CONTROL OF INTERNAL COMBUSTION ENGINES

The present invention relates to a safety circuit and, more particularly, to a safety circuit for an electronic throttle control of internal combustion engines, and especially for so-called electronic accelerators in motor vehicles, with a brake pedal and set point transmitter being coupled to the accelerator, an electronic circuit acting on a stepping motor, and a clutch interposed between the stepping motor and throttle actuated by the stepping motor, the throttle being coupled to an idle feedback device.

Throttle controls of the aforementioned type are generally equipped with a clutch such as, for example, a magnetic clutch, interposed between the stepping motor and throttle to increase the safety and certain constructions of the throttle control so that when the clutch is disengaged, the throttle may be returned by an idle return device to the original position, with the idle return device consisting, as a rule, of a coil or helical spring. This construction is particularly advantageous when other elements of the electronic circuit arrangement might, due to a defect, impede or impair the return of the throttle to an idle position.

While it would be a simple matter to link the actuation of the clutch with the actuation of an accelerator, i.e., for the clutch to be engaged whenever the accelerator is actuated, similar to the manner in which the brake lights are switched on when the brake pedal is actuated; however, this would mean that a certain free travel of the accelerator would have to be taken into account prior to a closing of the corresponding contact.

It would also be possible to connect the clutch of the throttle control with the brake pedal or, in other words, to provide an arrangement whereby the clutch would be disengaged when the brake pedal was actuated and the clutch would be engaged when the brake pedal was not actuated; however, a disadvantage of this latter arrangement resides in the fact that the technique of starting uphill using the foot brake, which is not a general occurrence but is performed by many drivers, would not be feasible, because the brake pedal upon being actuated would throw the thottle into an idle position thereby rendering the accelerator ineffective.

The aim underlying the present invention essentially resides in providing a safety circuit for a clutch of an electronic throttle control by which it is possible for an operator of a vehicle to retain normal driving habits.

In accordance with advantageous features of the present invention, a safety circuit for an electronic throttle control is provided wherein a clutch of the control is engaged when the accelerator and brake pedal are not actuated simultaneously and when the accelerator is actuated alone or together with the brake pedal, with the clutch being disengaged when the brake pedal alone is actuated.

A safety circuit for the electronic throttle control of the present invention is especially useful in internal combustion engines equipped with an idle stabilization device. According to the present invention the clutch is always engaged when the engine rotational speed drops below a certain level.

Advantageously, in accordance with the present invention, a switch actuated by the accelerator is provided with the switch having a middle contact. A further switch for actuation of the clutch is interposed between the middle contact and a positive pole of an electrical source such as a battery. The switch actuated by the accelerator also includes a resting contact with one or more brake lights, connected in parallel, being interposed or arranged between the resting contact and a negative pole of the battery. A further working contact is provided which is adapted to be actuated by the brake pedal. Further working contact is connected between the positive pole of the battery and the brake lights.

According to the present invention, an additional working contact, actuated by the idle stabilization device is connected between the middle contact of the switch actuated by the accelerator and the negative pole of the battery. A diode, which conducts in a direction of the brake lights, is connected between the resting contact of the accelerator actuated switch and the brake lights.

In accordance with further features of the present invention, a switch is provided for actuating the clutch, a diode for conducting current from a positive pole to a negative pole of a battery, and one or more brake lights connected in parallel may be disposed between the positive pole and negative pole of the battery. A working contact actuated by an accelerator is disposed between the negative pole of the battery and a connecting link from a circuit to the diode. A working contact is actuated by a brake pedal, with the working contact being disposed between the positive pole of the battery and a link from the diode to the brake lights.

In accordance with the present invention, the working contact actuated by the accelerator and the switching actuating clutch may be connected between the positive pole and negative pole of the battery in series, with a further switch actuated by the brake pedal being connected in parallel with the working contact. A middle contact of the further switch may be connected with the positive pole of the battery, with a resting contact of the further switch leading to a connecting link between the working contact actuated by the accelerator and the switch actuating the clutch. Additionally, one or more brake lights may be connected in parallel between the working contact of the further switch and the negative pole of the battery.

Advantageously, the working contact actuated by the idle stabilizing device may be connected in parallel with the working contact actuated by the accelerator.

The switch for actuating the clutch may, for example, take the form of a coil arrangement which is adapted to engage the clutch when the coil is energized or excited.

One advantage of the above-noted features of the present invention resides in the fact that the clutch is actuated only seldom during driving, that is, it is disengaged, and if a defect develops such as, for example, a speeding up of the rotational speed of the engine as a result of a defective set or desired point with the accelerator not being actuated, a driver of a motor vehicle would instinctively react by stepping on the brake pedal so that the problem which may have resulted is automatically eliminated by a disengagement of the clutch.

Accordingly, it is an object of the present invention to provide a safety circuit for an electronic throttle control for internal combustion engines which avoids, by simple means, shortcomings and disadvantages encountered in the prior art.

Another object of the present invention resides in providing a safety circuit for an electronic throttle control for internal combustion engines which avoids the necessity of free travel of pedals for engagement and disengagement of a clutch of the throttle control.

Yet another object of the present invention resides in providing a safety circuit for an electronic throttle control for internal combustion engines which avoids a too frequent actuation of a clutch of the throttle control thereby prolonging the life of the clutch.

A still further object of the present invention resides in providing a safety circuit for an electronic throttle control for internal combustion engines which is simple in construction and therefore relatively inexpensive to manufacture.

These and other objects, features, and advantages of the present invention will become more apparent from the following description when taken in connection with the accompanying drawing which shows, for the purposes of illustration only. several embodiments in accordance with the present invention, and wherein:

FIG. 1 is a schematic view of a first embodiment of a safety circuit for an electronic throttle control for internal combustion engines constructed in accordance with the present invention;

FIG. 2 is a schematic view of a second embodiment of a safety circuit for an electronic throttle control for internal combustion engines constructed in accordance with the present invention; and FIG. 3 is a schematic view of a third embodiment of a safety circuit for an electronic throttle control for internal combustion engines constructed in accordance with the present invention.

Referring now to the drawings wherein like reference numerals are used throughout the various views to designate like parts and, more particularly, to FIG. 1, according to this figure, a switch 6 is operatively connected with an accelerator 10 with the switch being illustrated in the position it occupies when the accelerator pedal 10 is not actuated. In the position of the switch 6 illustrated in FIG. 1 a middle contact 6a of the switch 6 is connected in a conducting manner with a resting contact 6b. An energizing or exciting coil 1 of a clutch 11 is disposed between the middle contact 6a and a positive pole of a battery, with the clutch 11 being engaged when the coil 1 is excited. The clutch 11 is interposed between stepping motor 12 and throttle 13 activated by the stepping motor 12. Electronic circuit 14 actuates stepping motor 12. The working contact 6c of the switch 6 is connected to the negative pole of the battery, with an electrically conductive link extending from the resting contact 6b to one lead of each of two brake lights 3 of a motor vehicle (not shown), which brake lights are connected in parallel. The other leads of the brake lights 3 are connected to the negative pole of the battery.

A working contact 2 is adapted to be actuated by a brake pedal 15, with the working contact 2 being located between the parallel connected brake lights and the positive pole of the battery. The working contact 2 is adapted to be closed when the brake pedal 15 is actuated. If the vehicle is equipped with an idle stabilization device 8, of conventional construction, the stabilization device could close a switch contact which is connected in parallel with the working contact 6a, 6b, 6c of switch 6 outside the control of the throttle whenever the engine rotational speed falls below a predetermined value. In order to prevent a short circuit under these circumstances, a diode 5 is provided which is adapted to conduct in a direction of the brake lights 3, with the diode 5 being disposed between the resting contact 6b and the brake lights 3.

When the accelerator pedal 10 and brake pedal 15 are not operated, in otherwords when the elements are in the position illustrated in FIG. 1, a current flows from the positive pole of the battery through the coil 1 energizing or exciting the same, the resting contact 6b, diode 5, and filaments of the brake lights 3 to the negative pole of the battery. This current flow is also in engagement of the clutch; however, the voltage applied to the brake lights 3 and the current flowing through them are too small to result in a lighting of the brake lights 3. When the accelerator or gas pedal 10 is actuated, the circuit to the coil 1 is closed by the working contact 6c so that no current flows through the brake lights if the brake is not actuated. If the brake pedal 15 is actuated but the accelerator or gas pedal 10 is not, the brake lights 3 will burn brightly but the coil 1 will be de-energized thereby disengaging the clutch since, in this case, the same potential is applied to both terminals of the coil 1. When the gas and brake pedal 10 and 15 are simultaneously actuated, the coil 1 is energized through the working contact 6c thereby resulting in an engagement of the clutch.

FIG. 2 provides an example of another safety circuit for an electronic throttle control which has the same effect as the circuit of FIG. 1. The difference between the circuit of FIG. 2 resides in the fact thate there is a fixed connection between the coil 1 and diode 5, which is connectible with the negative pole of a battery through a working contact 4 actuated by an accelerator or gas pedal instead of the switch 6 in the construction of FIG. 1.

FIG. 3 provides another example of a safety circuit for an electronic throttle control for internal combustion engines wherein a current flowing through the coil 1 is prevented from also flowing through the filament of the brake lights. In this connection, the working contact 4 and coil 1 for the clutch are connected between the positive pole and negative pole of the battery. A switch 7 is provided having a resting contact 7a, 7b, with the switch 7 being adapted to be actuated by the brake pedal. The resting contact 7a, 7b of the switch 7 is connected in parallel with the working contact 4. A central contact 7a of the switch 7 is connected with a positive pole of the battery. One or more brake lights 3, wired in parallel, are connected between the working contact 7c and the negative pole of the battery. When an idle stabilization device 8 is provided as noted hereinabove, the working contact 9 is actuated by the stabliziation device, with the contact 9 being connected in parallel with the working contact 4 actuated by the accelerator or gas pedal.

The safety circuit of FIG. 3 achieves the same effect as far as the clutch actuation is concerned as the circuit of FIGS. 1 and 2 and yet has an additional advantage inasmuch as the safety circuit of FIG. 3 no diode is necessary to protect against short circuits.

As can readily be appreciated, other circuits are possible by providing another type of clutch control, i.e., disengaging the clutch by causing the current to flow through the coil or by applying the positive pole of the battery to the vehicle ground, etc.

While I have shown and described several embodiments in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A safety circuit for an electronic throttle control for internal combustion engines in motor vehicles having a brake pedal means, an accelertor means, a stepping motor, electronic means for controlling the stepping motor, a throttle means actuated by the stepping motor, and a clutch means interposed between the stepping motor and throttle means, characterized in that the safety circuit includes means for engaging the clutch means when the accelerator means and brake pedal means are not actuated simultaneously and when the accelerator means is actuated alone or together with the brake pedal means and for disengaging the clutch means when the brake pedal means is actuated alone.

2. A safety circuit according to claim 1, characterized in that an idle stabilization means is provided for the engine, and in that means are connected with the stabilization means for engaging the clutch means when a rotational speed of the engine drops below a predetermined minimum speed.

3. A safety circuit according to claim 2, characterized in that the means for engaging and disengaging the clutch means includes a first switch means adapted to be actuated by the accelerator means, a second switch means adapted to be actuated by the brake pedal means, the first switch means includes a middle contact means, a resting contact means, and a working contact means connected directly to a negative pole of an electrical energy source of the vehicle, the means for actuating the clutch means are disposed between the middle contact means and the positive pole of the electrical energy source, at least one motor vehicle brake light is connected to the safety circuit between the resting contact and the negative pole of the energy source, and in that the second switch means includes a working contact means arranged between the positive pole of the energy source and the at least one brake light.

4. A safety circuit according to claim 1, characterized in that the means for actuating the clutch means includes a coil means adapted to engage the clutch means when the coil means is energized, and in that a plurality of brake lights are provided and connected in parallel.

5. A safety circuit according to claim 4, characterized in that the means connected with the stabilization means for engaging the clutch means includes a working contact means actuated by the stablization means, the last mentioned working contact means is connected between the middle contact means of the first switch means and the negative pole of the energy source, and in that a diode means is connected between the brake lights and the resting contact means of the first switch means for conducting electrical current in a direction of the brake lights.

6. A safety circuit according to claim 1, characterized in that the means for engaging and disengaging the clutch means includes, a working contact means actuated by the accelerator means, and a working contact means actuated by the brake pedal means, a diode means is provided for conducting current from a positive pole or the negative pole of the electrical energy source, a first connecting circuit link is provided between the actuating means and diode means, at least one brake light of the motor vehicle is disposed between the positive pole and negative pole of the energy source, a second connecting circuit link is provided between the diode means and the at least one brake light, the working contact means actuated by the accelerator means is disposed between the negative pole of the energy source and the first connecting circuit link, and in that the working contact means actuated by the brake pedal means is disposed between the positive pole of the energy source and the second connecting circuit link between the diode means at the at least one brake light.

7. A safety circuit according to claim 6, characterized in that a plurality of brake lights are provided and are connected in parallel.

8. A safety circuit according to one of claims 6 or 7, characterized in that the means for actuating the clutch means includes a coil means adapted to engage the clutch means when the coil means is energized.

9. A safety circuit according to claim 1, characterized in that the means for engaging and disengaging the clutch means includes a working contact means actuated by the accelerator means, a switch means actuated by the brake pedal means the switch means including a working contact means, a metal contact means connected with a positive pole of an electrical energy source, and a resting contact means connected to a circuit link between the working contact means actuated by the accelerator means and the actuating means for the clutch means, at least one brake light is connected between the working contact means of the switch means and the negative pole of the energy source.

10. A safety circuit according to claim 9, characterized in that the means for actuating the clutch means is a coil means adapted to engage the clutch means when the coil means is energized.

11. A safety circuit according to one of claims 9 or 10, characterized in that a plurality of brake lights are provided and are connected in parallel.

12. A safety circuit according to one of claims 6 or 9, characterized in that an idle stablization means is provided for the engine, means are connected with the stablization means for engaging the clutch means when the rotational speed of the engine drops below a predetermined minimum speed including a working contact means actuated by the idle stabilization means, and in that the working contact means actuated by the idle stabilization means is connected in parallel with the working contact means actuated by the accelerator means.

* * * * *